US006650895B1

(12) United States Patent
Ravishankar et al.

(10) Patent No.: US 6,650,895 B1
(45) Date of Patent: Nov. 18, 2003

(54) IN-CALL DTMF TRANSPORT FOR GEOSTATIONARY MOBILE SATELLITE COMMUNICATION SYSTEM

(75) Inventors: Channasandra Ravishankar, Germantown, MD (US); David Roos, Boyds, MD (US); Anthony Noerpel, Lovettsville, VA (US); Chandra Joshi, Gaithersburg, MD (US); James Hobza, Carlsbad, CA (US); Prabir Datta, New Delhi (IN); Yi Chen, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/447,696

(22) Filed: Nov. 23, 1999

Related U.S. Application Data

(60) Provisional application No. 60/109,747, filed on Nov. 21, 1998, and provisional application No. 60/110,250, filed on Nov. 30, 1998.

(51) Int. Cl.[7] .................................................. H04Q 7/20
(52) U.S. Cl. .................... 455/422.1; 455/560; 455/564; 455/427
(58) Field of Search ................................ 455/560, 564, 455/427, 422.1; 379/355.01, 355.03, 357.03, 230, 221.08, 283; 370/467, 469

(56) References Cited

U.S. PATENT DOCUMENTS

| | | | | |
|---|---|---|---|---|
| 5,247,565 A | * | 9/1993 | Joglekar et al. | 455/564 |
| 5,276,729 A | * | 1/1994 | Higuchi et al. | 455/564 |
| 5,521,925 A | * | 5/1996 | Merakos et al. | 370/337 |
| 5,666,357 A | | 9/1997 | Jangi | |
| 5,953,676 A | * | 9/1999 | Berry et al. | 455/564 |
| 5,983,117 A | * | 11/1999 | Sandler et al. | 455/557 |
| 5,991,619 A | * | 11/1999 | Choi | 455/432.2 |
| 6,009,152 A | * | 12/1999 | Bourhis | 379/93.09 |
| 6,035,220 A | * | 3/2000 | Claudio et al. | 455/564 |
| 6,101,401 A | * | 8/2000 | Mou et al. | 455/564 |
| 6,199,165 B1 | * | 3/2001 | Grunner | 713/201 |
| 6,256,488 B1 | * | 7/2001 | Lee et al. | 455/401 |
| 6,298,055 B1 | * | 10/2001 | Wildfeuer | 370/352 |
| 6,360,110 B1 | * | 3/2002 | Schmidt | 455/564 |

FOREIGN PATENT DOCUMENTS

| | | |
|---|---|---|
| EP | 0 851 692 A2 | 7/1998 |
| GB | 2 290 005 A | 12/1995 |

* cited by examiner

Primary Examiner—William Trost
Assistant Examiner—Sharad Rampuria
(74) Attorney, Agent, or Firm—John T. Whelan; Michael Sales

(57) ABSTRACT

A system and a methodology to improve the end-user quality of service both in terms of response time and reliability for the transport of in-call DTMF signals in wireless systems, particularly in geostationary mobile satellite systems. The methodology encompasses several techniques to provide acceptable end-to-end quality of service for DTMF. A technique is applicable for transport of DTMF in the wireless subscriber to network direction, where DTMF digits are carried in the form of an out-band message. The central part of the technique is to allow multiple key presses in the same message, thereby increasing efficiency and throughput in long-delay environment. Another technique utilizes the vocoder's functionality to carry DTMF in-band, thereby reducing system complexity. The scheme makes the use of an integrated DTMF detector which can classify a given frame of signal into several classes so that the DTMF encoded packet can carry a unique pattern across the air-interface to the voice decoder at AT, which is capable of identifying the pattern. Another technique pertains to the use of a message based DTMF transport between two-ATs on a separate logical channel with a unique Service Access point Identifier (SAPI) providing guaranteed service for DTMF transport in an AT-AT call.

11 Claims, 5 Drawing Sheets

IN-CALL DTMF TRANSPORT FOR GEOSTATIONARY MOBILE SATELLITE COMMUNICATION SYSTEM

This application claims benefit of U.S. provisional application serial No. 60/109,747, filed Nov. 24, 1998 and provisional application serial No. 60/110,250 filed Nov. 30, 1998.

BACKGROUND OF THE INVENTION

1. Field of the Invention

The present invention relates to improving end-to-end quality of service and increasing efficiency and throughput of in-call DTMF transport in long-delay telecommunication environments, particularly in geostationary mobile satellite wireless product systems.

2. Background and Description of Related Art

Dual Tone Multi-Frequency (DTMF) signals are often used independently of a signaling system and after a call has been established to provide end-user access to specialized services. As defined in ITU-T Q.23, the 16 DTMF signals, i.e., 0, 1, 2, . . . 9, A, B, C, D, *, and #, are generated by push-button telephones using a combination of four low group frequencies and four high group frequencies. For clarity, such applications of DTMF signals will be referred to as "in-call DTMF" with individual transmission of each DTMF signal.

In-call DTMF transport based on out-band procedures have been used in wireless systems such as Global System for Mobile (GSM) Communications as described in the GSM 03.14 specification to achieve robust signaling. In the GSM specification, separate DTMF_START and DTMF_STOP messages are transmitted from the handset to the network for each digit pressed on the key pad. Furthermore, a DTMF_STOP can only be transmitted after an acknowledgement is received from the network for DTMF_START message. For wireless systems with long delay, especially geostationary mobile satellite communication systems, use of this protocol is extremely inefficient as explained below.

Use of GSM 03.14 design implies that two DTMF digits are separated by greater than 2*(round-trip delay+processing delay in forward direction+processing delay in reverse direction). For the geostationary satellite system environment with round-trip delays of the order of 520–540 ms, this means that interdigit separation is greater than 1.1 second (excluding processing delays). Thus the resulting interdigit separation in such an environment may be as high as 1.5 to 2 seconds when processing delays and interleaving delays are included. As an extreme example, a single press of a radial key on the handset that requires 10 digits to be sent to the network will take 15 to 20 seconds to reach the network. From an end-user perspective this can be extremely annoying.

It is noted that there exists other out-band DTMF transport protocols to enable the transfer of DTMF signals between devices such as described in U.S. Pat. No. 5,835,574 to Lam for "Dual-Tone Multi-Frequency Signal Transfer Protocol," issued Nov. 10, 1998. However, this DTMF protocol is applicable during the call setup phase of the call and is not applicable for in-call DTMF transport which is the subject of this invention. In the above-mentioned patent, the DTMF receiving entity first sends a DTMF ready tone for a prescribed interval, after which the DTMF transmitting entity sends a packet with DTMF digits. For in-call DTMF transport, however, the DTMF receiving entity is not even aware of an ensuing DTMF signal and therefore the technique mentioned in the prior art mentioned above cannot be used.

It would be desirable to provide improved end-to-end quality of service for in-call DTMF signal transport in long-delay telecommunication environments.

SUMMARY OF THE INVENTION

Schemes are employed in GSM to allow for a single key press in one message, i.e., two messages per digit, which forces the gap between two successive digits, as seen by the DTMF detector in the network, to be more than twice the round-trip delay in a wireless system such as a mobile satellite system, where the delay can be as high as 1.5 seconds. In TDMA systems where interburst interleaving is used to provide additional robustness, the interdigit gap may be as high as 2 seconds. As discussed, this means that a user may have to wait approximately 15–20 seconds before a response is received from the service, for a 10-digit number that the user may press from the telephone memory, assuming there is no retransmission.

In GSM systems, the mobile-to-mobile call is treated as a concatenation of a mobile-originated call (MOC) and mobile-terminated call (MTC); there being no guarantee on transporting DTMF from Network to mobile, and thus the transport of DTMF in a mobile-to-mobile call is not a guaranteed service. In-band techniques, such as those used in GSM Full Rate systems, do not guarantee reliable delivery of the in-call DTMF signals in the Network-to-AT mobile direction. This is because DTMF signals are processed as regular speech, therefore, the system models, quantizes and transmits the DTMF signal in the same way as speech. Hence, the output of the voice decoder at the AT is subject to signal modeling and quantization distortion.

Briefly summarized, the present invention relates to a system and a methodology that will improve the end-user quality of service both in terms of response time and reliability for the transport of in-call DTMF signals in wireless systems, particularly in geostationary mobile satellite systems. The methodology encompasses three distinct techniques to provide acceptable end-to-end quality of service for DTMF. The first technique is applicable for transport of DTMF in the wireless subscriber to network direction, where DTMF digits are carried in the form of an out-band message. The central part of the new technique is to allow multiple key presses in the same message, thereby increasing efficiency and throughput in long-delay environment. The second technique utilizes the vocoder's functionality to carry DTMF in-band, thereby reducing system complexity. The scheme makes the use of an integrated DTMF detector which can classify a given frame of signal into several classes so that the DTMF encoded packet can carry a unique pattern across the air-interface to the voice decoder at AT, which is capable of identifying the pattern. The third technique pertains to the use of a message based DTMF transport between two ATs on a separate logical channel with a unique Service Access point Identifier (SAPI), thereby providing guaranteed service for DTMF transport in an AT-AT call.

It will be understood that both the foregoing general description and the following detailed description are exemplary and intended to provide further explanation of the invention as claimed. The accompanying drawings provide an understanding of the invention as described in the preferred embodiments to illustrate the invention and to serve to explain the principles of the invention.

DESCRIPTION OF THE PREFERRED EMBODIMENTS

Figure 1:
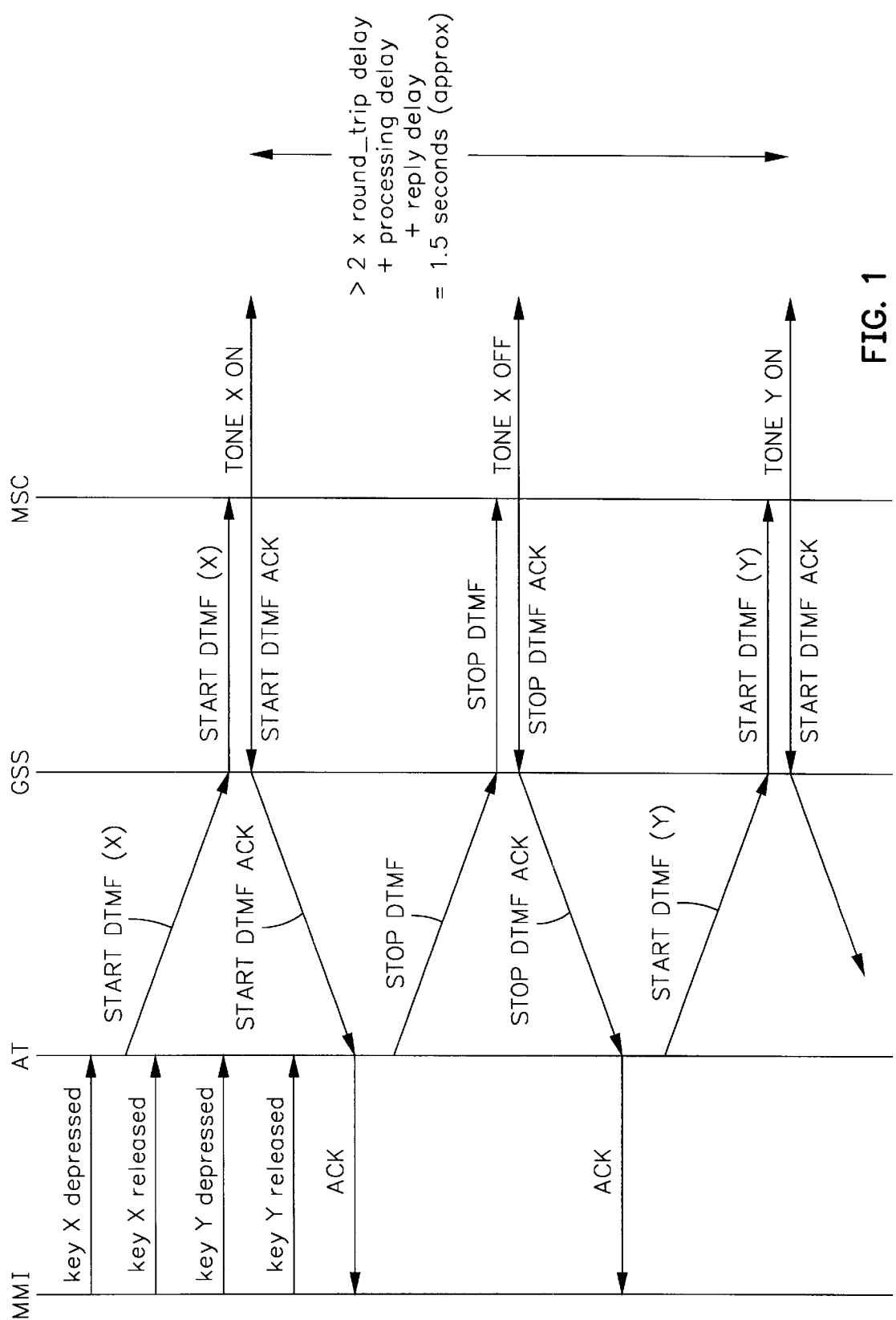
FIG. 1 is an illustration of the approximate 1.5 second gap between two digits when GSM method is used for a geostationary mobile satellite system.
Figure 2:
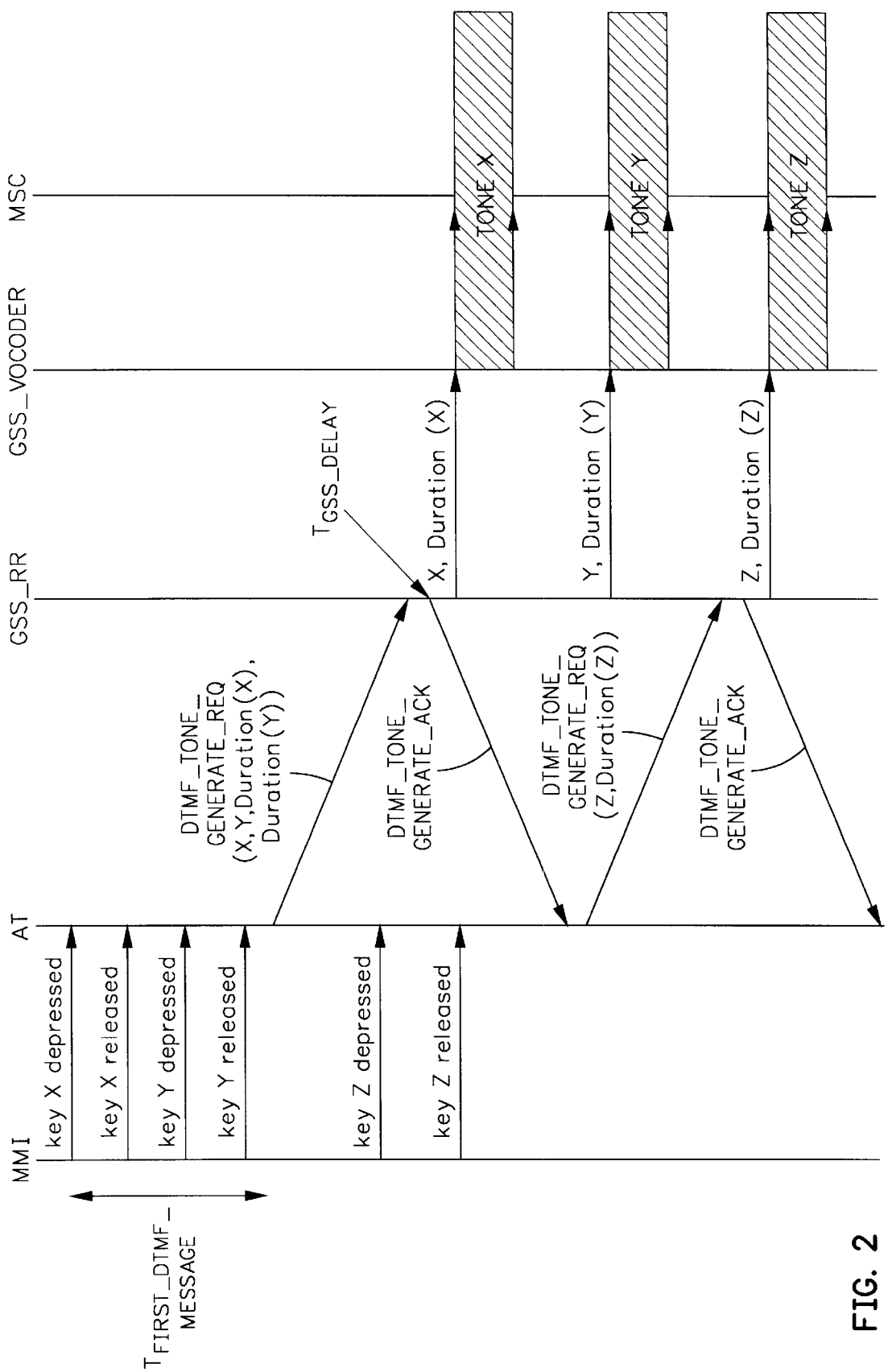
FIG. 2 is a call flow representation of AT to Network DTMF transport in accordance with the present invention.
Figure 3:
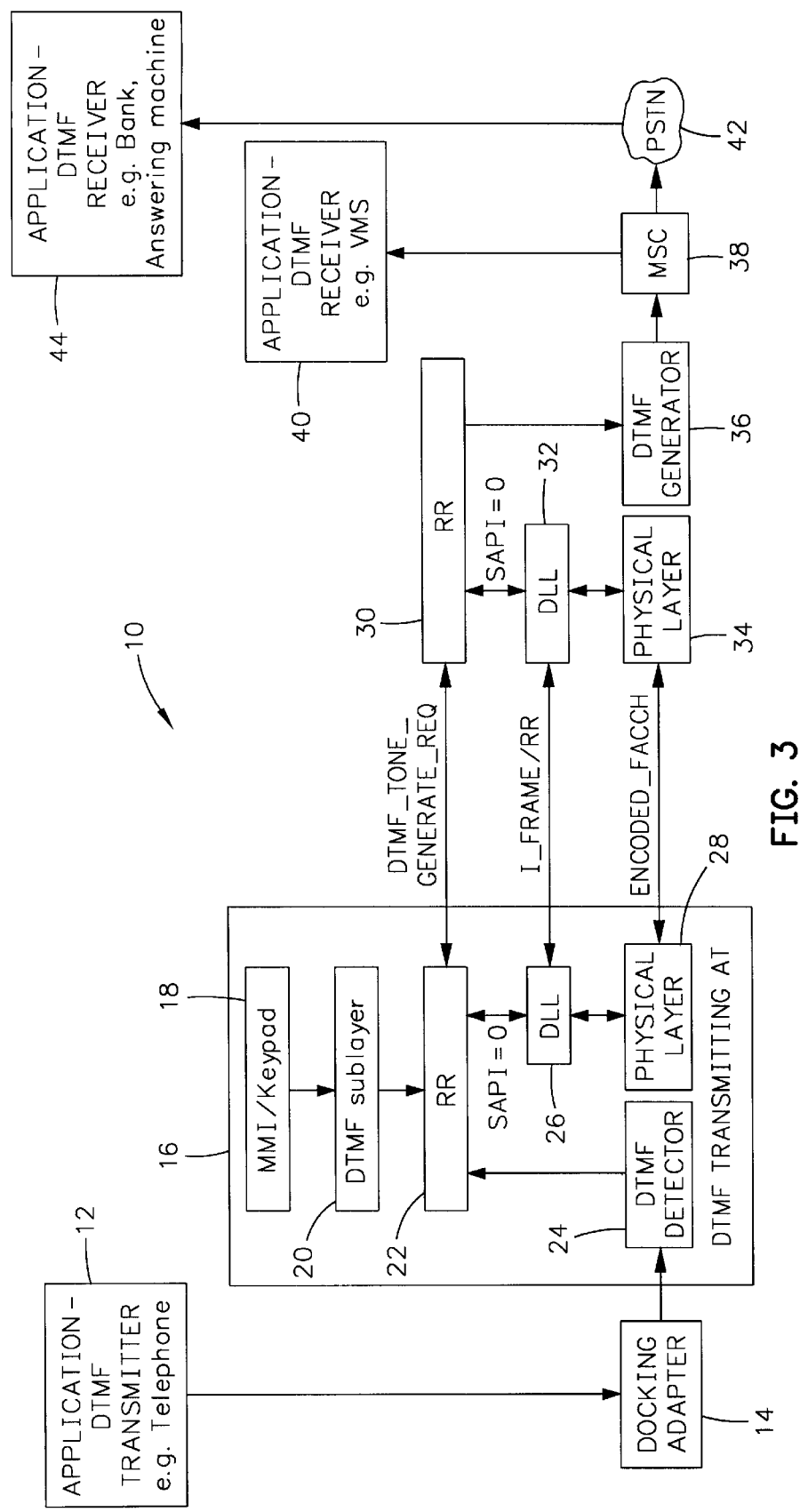
FIG. 3 is a functional block diagram of DTMF handling in AT to Network direction for the call flow representation of FIG. 2.

FIG. 1 exemplifies schemes employed in GSM to allow for individual DTMF key messaging. With reference to FIGS. 2 and 3, the described embodiments highlight solutions to provide acceptable end-to-end quality of service for DTMF in wireless communication systems, particularly in geostationary mobile satellite systems. To this end, details of the implementation of the present preferred embodiments are addressed in three directions in which DTMF transport may be required, i.e., (1) AT-to-network, (2) network-to-AT, and (3) AT-to-AT.

AT to Network Direction

The first technique enhances the transport of DTMF signals in AT-to-network direction in which DTMF carriage is message-based. The main advantage here is that efficiency and throughput will be increased, by allowing multiple key presses in the same message. Provision is also made for long key presses.

The scheme used in GSM can allow only one key press in one message, i.e., two messages per digit, which force the gap between two successive digits, as seen by the DTMF detector in the network, to be more than twice the round-trip delay in a wireless system such as a mobile satellite system, where the delay can be as high as 1.5 seconds (see, e.g., FIG. 1). In TDMA systems where interburst interleaving is used to provide additional robustness, the interdigit gap may be as high as 2 seconds. This means that a user may have to wait approximately 15–20 seconds before a response is received from the service, for a 10-digit number that the user may press from the telephone memory, assuming there is no retransmission. As discussed, this delay is deemed unacceptable.

With reference to FIG. 3, a functional block diagram of the DTMF handling embodiment in the AT to Network direction illustrates a DTMF transmitting access terminal (AT) coupled via a wireless network to a public switch telephone network (PSTN). Herein, typically, a key-press on the transmitting AT 16 results in a DTMF signal to be generated at the network side. However, it is also possible (especially for fixed applications) that by means of a docking adapter 14, regular telephones 12 can be connected to the AT 16 which may also generate DTMF signals. The docking adapter 14 simply adapts the 2-wire analog interface of telephone 12 to any proprietary interface required by the AT 16. As shown in FIG. 3, the DTMF transmitting AT 16 may communicate at various functional layers, including the network radio resource management layer 30, the Data Link Layer (DLL) 32, or the physical layer 34 of the wireless communication system. The radio resource management layer 30 of the wireless network is then coupled to a DTMF generator subsystem 36 in communication with a mobile switching center (MSC) 38 which may be coupled directly to an application DTMF receiver 40 or the public switch telephone network (PSTN) 42. The PSTN may link a PSTN application DTMF receiver 44 to the PSTN 42. An example of an application receiver 40 may be a directly-coupled voicemail system (VMS) coupled to the MSC 38. Examples of an application DTMF receiver coupled to the PSTN 42 may include customer equipment such as answering machines and the like.

In the AT to Network direction DTMF carriage is message-based. The key messages are identified as follows:

a) DTMF_TONE_GENERATE_REQ: containing multiple digits (from 0–9, A, B, C, D, *, #) with appropriate tone durations;

b) DTMF_TONE_GENERATE_ACK: an acknowledgement for DTMF_TONE_GENERATE REQ.

Typically, these RR_layer messages are carried out-band on dedicated control channels, such as FACCH (Fast Associated Control Channel).

A DTMF_TONE_GENERATE_REQ message is invoked by the AT. It is transmitted to the base station (or gateway station subsystem for satellite networks, referred to as GSS), whose service access point identifier (SAPI) indicates a 0. At the GSS, the RR_layer parses the digit information and instructs the vocoder in the physical layer to generate DTMF tones with appropriate tone duration towards the MSC, which performs the appropriate routing of the tones. A simplified call-flow diagram and a functional block diagram of the DTMF transport scheme at AT-network direction is illustrated in FIGS. 2 and 3, respectively.

Figure 4:
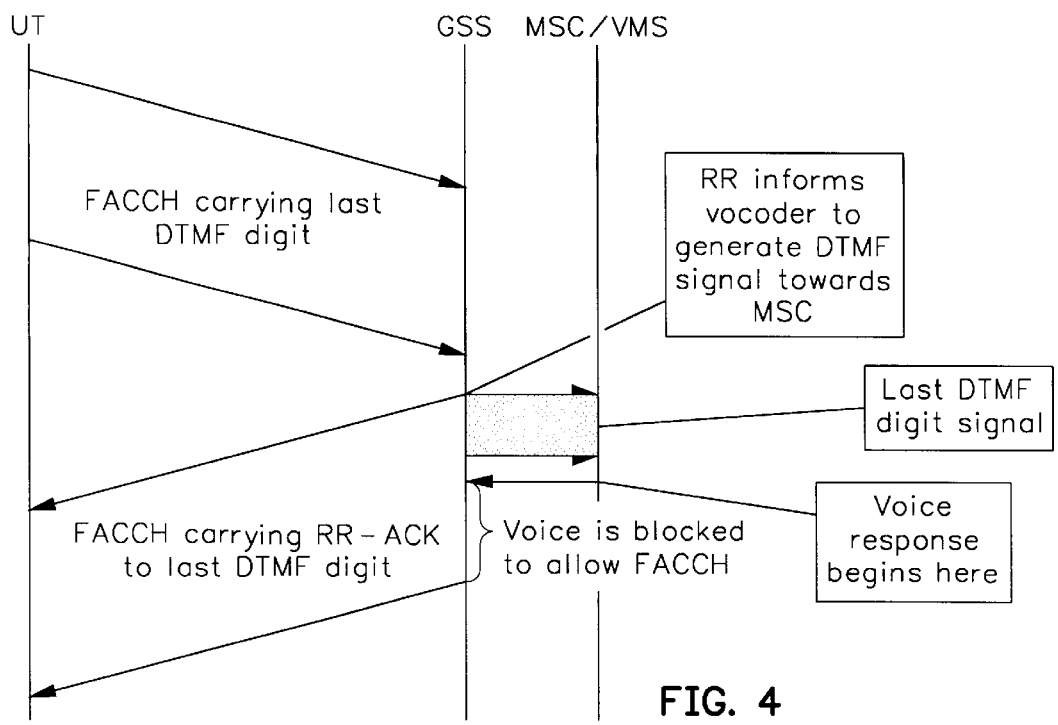
FIG. 4 is an illustration of a voice clipping problem due to a race condition between voice response and RR_ACK.
Figure 5:
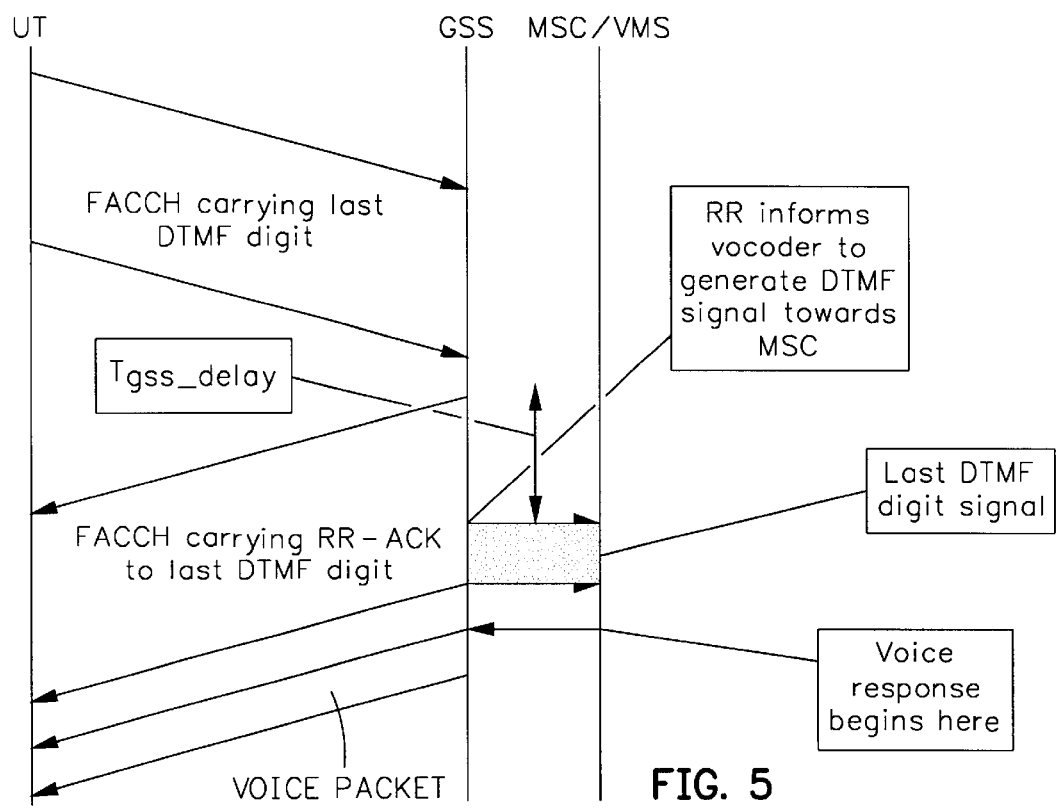
FIG. 5 is an illustration of the role of $T_{GSS\_DELAY}$ in preventing voice clipping.

As shown in FIG. 2, a delay $T_{GSS\_DELAY}$ is introduced between the time the GSS sends an acknowledgement to the AT and the time at which it instructs the vocoder at GSS to generate in-band tones. The DTMF_TONE_GENERATE_ACK which is carried as a FACCH may occupy the dedicated channel long enough to mutilate a possible voice response generated by the DTMF receiving application (after the last DTMF has been received by it). Therefore, this delay is introduced to prevent the "race" condition and avoid voice clipping in the direction of GSS to AT. The problem of voice clipping is depicted in FIG. 4 and the use of $T_{GSS\_DELAY}$ is depicted in FIG. 5.

Preferably, the AT waits for a $T_{FIRST\_DTMF\_MESSAGE}$ (approximately equal to the sum of round trip delay and processing delay) to expire from the time the first key is pressed before forming a DTMF_TONE_GENERATE_REQ message toward GSS. If the first digit has not been released at the expiry of the $T_{FIRST\_DTMF\_MESSAGE}$, then the AT waits for its release before the first DTMF_TONE_GENERATE_REQ message is sent to the network. After that the AT collects all the digits pressed until a DTMF_TONE_GENERATE_ACK is received by the AT and forms a new message to be transmitted to GSS. This scheme also implies that a key that is pressed but not released will also be transmitted in the DTMF_TONE_GENERATE_REQ message, except that for this digit it will indicate that the key has not yet been released. The GSS vocoder resumes normal voice decoding operation upon receipt of an active voice burst while waiting for another instruction from RR_layer. An exception to this rule is when the last digit of previous instruction from RR specified a tone duration of less than 50 msec and the digit was not released at AT. In this case, the GSS vocoder will confirm tone generation for another 80 msec before resuming normal voice-decoding operation. Though not shown in FIG. 2, an audio tone is generated internally by the AT when a key is pressed.

Network to AT Direction

The second technique is pertinent to the transport of DTMF from network side to mobile subscriber side. The technique makes use of the capability of a vocoder to detect and regenerate DTMF in the network to subscriber direction. In the scheme, a DTMF encoded packet will carry a unique pattern across the air-interface to the voice decoder, which is capable of identifying DTMF carrying packet pattern and generate a DTMF tone as indicated in the packet. By this approach, there will be no modeling and quantization distortion, thereby ensuring a clean and correct DTMF signal to be generated by voice decoder. Furthermore, by carrying DTMF in-band, the system complexity is reduced.

In-band techniques, such as the one used in GSM in network-to-mobile direction, does not guarantee reliable delivery of DTMF. This is because DTMF signals are processed as regular speech, therefore, it models, quantizes, and transmits DTMF-encoded bits in the same way as speech. Hence, the output of the voice decoder at the AT is subject to modeling and quantization distortion.

Where mobile satellite communication systems are applicable in developing parts of the world, the Network to AT direction is of interest due to there being a lack of infrastructure to provide wireline service, implying fixed subscriber applications in addition to mobile, e.g., an answering machine attached to a fixed terminal. DTMF towards such fixed subscriber applications are more likely than for mobile subscribers.

This embodiment makes use of the capability of a vocoder to detect and regenerate DTMF in the network to subscriber direction. More specifically, the vocoder should have an integrated DTMF detector which first classifies a given frame of signal into several classes such as voice, single frequency tone, DTMF, silence, and background noise. Depending on the classification, it performs appropriate modeling and quantization. Hence, the DTMF signal is encoded differently than normal voice signal and the DTMF encoded packet carries a unique pattern across the air-interface to the voice decoder at the AT. The voice decoder at the AT is then capable of identifying the pattern as a DTMF-carrying packet and generates a DTMF tone as indicated in the voice-encoded packet.

The technique here assumes that in network-to-AT direction, DTMF is carried in-band, which can be justified by the following reasons: First, it is noted that while out-band transport (similar to that in AT-to-network) is a technical possibility, it is not necessary since the channel is expected to be extremely benign to fixed subscribers. Second, the information to be transmitted for DTMF is much less than that for normal voice, and because of the technique mentioned above, a DTMF encoded packet format which is different from that for normal voice is possible, all the DTMF information in the packet can be embedded in Class 1 FEC bits, therefore all the information is well protected and any errors resulting from the channel are corrected by FEC. The third reason is the simplicity of the implementation.

AT-to-AT Direction

The third technique applies to where DTMF is transported in an AT-to-AT call in a mobile satellite communication system. In this scheme, DTMF transport between two ATs on a single-hop voice connection is message-based on a separate logical link. By having a separate logical link, the technique also leads itself to deducing information transfer between two ATs by listening to each of them at the network; thereby providing interception capabilities in the network.

In GSM, a mobile-to-mobile call is treated as a concatenation of a mobile-originated call (MOC) and mobile-terminated call (MTC), and there is no guarantee on transporting DTMF from network to AT, i.e., the transport of DTMF in an AT-to-AT call is an unguaranteed service.

Figure 6:
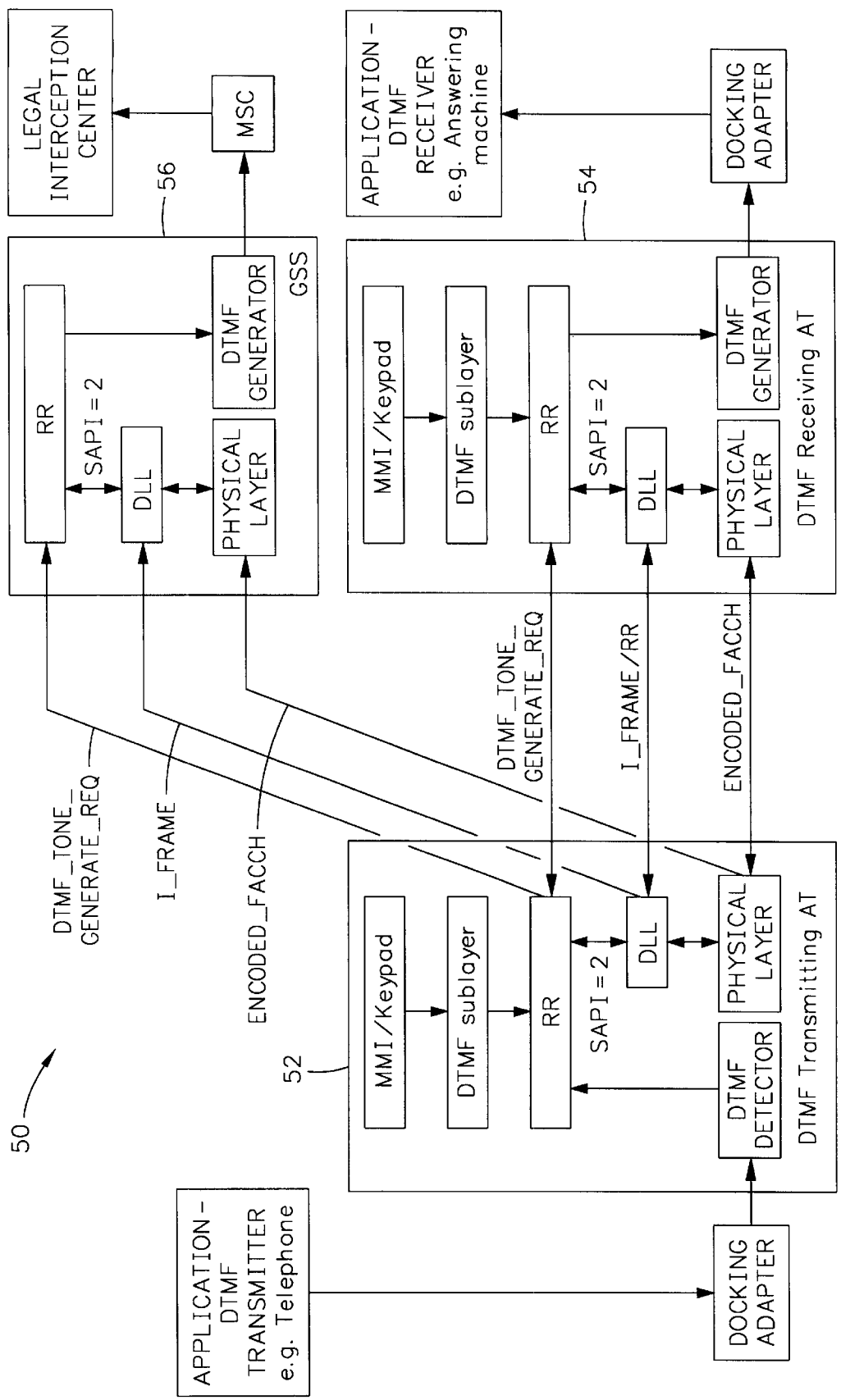
FIG. 6 is a functional block diagram of DTMF handling between two ATs in accordance with the present invention.

In AT-to-AT direction, the embodiment uses the technique which supports DTMF transport with a single hop and RR_message_based service, which is delivery-guaranteed. The message is transmitted on SAPI=2 between the two ATs. The transmission is illustrated in FIG. 6. The functional block diagram of the DTMF handling between two ATs is illustrated in the system 50 in which communication between a first AT 52 and a second AT 54 is shown under the control of a gateway station subsystem 56, as discussed herein.

The same message is received by GSS on the AT→GSS link for providing information to the legal interception center. The RR_layer in GSS instructs the vocoder in GSC to generate in-band tones (similar to the AT-PSTN scenario) toward the MSC, which in turn are routed to the legal interception center. It is noted that for single-hop AT-to-AT calls, traffic channel does not exist on the GSS→AT link (traffic channel only exists on AT→GSS link for AT-to-AT calls), which implies that messages on SAPI-2 link between AT and gateway is unidirectional and unacknowledged. Hence, the DLL functionality for handling SAPI-2 messages is augmented to handle missing and/or repeated layer-2 frames.

It should be appreciated that a wide range of changes and modifications may be made to the preferred embodiments for improved in-call DTMF transport for geostationary mobile satellite communication system as described herein. For example, in the Network to AT direction, the same technique as described for AT to Network direction can be used, but with increased complexity. Further, the DTMF sublayer and RR-layer in the AT 16 could be merged into one sublayer. In addition, the DTMF detector in AT 16 could be connected to the DTMF sublayer rather than RR-layer depending on the implementation. Thus, it is intended that the foregoing detailed description be regarded as illustrative rather than limiting, and that the following claims, including all equivalents, are intended to define the scope of the invention.

What is claimed is:

1. A system for in-call DTMF transport in long delay environments, comprising:
   an access terminal (AT) for coupling a dual tone multi-frequency (DTMF) transmission application to a wireless network, the AT comprising:
   a DTMF presentation sublayer allowing application specific generation of DTMF signals;
   a radio resource management layer coupled to said DTMF presentation sublayer for receiving AT DTMF signals;
   said radio resource management layer converting DTMF digits to out-band messages;
   a network communication link for receiving said out-band messages from said radio resource management layer for communicating the DTMF signals as out-band messages.

2. A system as recited in claim 1 wherein said radio resource management layer converts multiple DTMF key signals to a reduced set of out-band messages.

3. A system as recited in claim 2 wherein said radio resource management layer converts multiple DTMF signals to a single out-band message for transmission over the wireless network.

4. A system as recited in claim 3 wherein said radio resource management layer converts the DTMF signals into packet data for transmission over the wireless network.

5. A system for in-band message transport in long delay environments, comprising:
- a voice encoder in gateway having an integrated DTMF detector that detects DTMF signal and encodes into a packet with a special pattern; and
- a voice decoder coupled to said radio resource management layer for coding the DTMF signals as in-band signals coupled directly to a wireless network.

6. A system as recited in claim 5 wherein said vocoder is provided as an integrated DTMF detector which classifies data frames into DTMF encoded packets for transmission of unique data patterns across the wireless network via the vocoder at the AT.

7. A system as recited in claim 6 wherein said AT identifies the data patterns responding to the DTMF message signal encoded packets.

8. A system as recited in claim 5 wherein said radio resource management layer converts the DTMF signals into packet data for transmission over the wireless network.

9. A system for in-call signaling transport in long delay environments, comprising:
- an access terminal (AT) for coupling a dual tone multi-frequency (DTMF) transmission application to a wireless network, the AT comprising:
  - a DTMF presentation sublayer allowing application specific generation of DTMF signals;
  - a radio resource management layer coupled to said DTMF presentation sublayer for receiving AT DTMF signals;
  - a network communication link for receiving out-band messages from said radio resource management layer for communicating the DTMF signals; and
  - a communications channel for use by said AT providing a unique service access point identifier (SAPI) for DTMF message signal transport.

10. A system as recited in claim 9 wherein said radio resource management layer converts the DTMF signals into out-band messages for transmission over the wireless network.

11. A system as recited in claim 9 comprising a second AT in communication with said first AT under the control of a gateway station subsystem, wherein the separate channel provides in-call signaling between said first and second ATs during communications therebetween.

\* \* \* \* \*